(12) United States Patent
Amthor et al.

(10) Patent No.: US 11,754,392 B2
(45) Date of Patent: Sep. 12, 2023

(54) DISTANCE DETERMINATION OF A SAMPLE PLANE IN A MICROSCOPE SYSTEM

(71) Applicant: CARL ZEISS MICROSCOPY GMBH, Jena (DE)

(72) Inventors: Manuel Amthor, Jena (DE); Daniel Haase, Zöllnitz (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 771 days.

(21) Appl. No.: 16/720,745

(22) Filed: Dec. 19, 2019

(65) Prior Publication Data

US 2020/0200531 A1 Jun. 25, 2020

(30) Foreign Application Priority Data

Dec. 20, 2018 (DE) ...................... 10 2018 133 188.6

(51) Int. Cl.
*G01C 11/02* (2006.01)
*G01C 11/06* (2006.01)
(Continued)

(52) U.S. Cl.
CPC .............. *G01C 11/02* (2013.01); *G01C 11/06* (2013.01); *G02B 21/26* (2013.01); *G02B 21/367* (2013.01); *G02B 21/06* (2013.01)

(58) Field of Classification Search
CPC ......... G01C 11/02; G01C 11/06; G01C 11/10; G02B 21/006; G02B 21/06; G02B 21/26; G02B 21/361; G02B 21/367
(Continued)

(56) References Cited

U.S. PATENT DOCUMENTS

| 6,456,899 B1* | 9/2002 | Gleason | G03F 7/7065 |
| | | | 706/900 |
| 2003/0142862 A1* | 7/2003 | Snow | G01C 11/06 |
| | | | 382/154 |

(Continued)

FOREIGN PATENT DOCUMENTS

| DE | 102014102080 A1 | 8/2015 |
| DE | 102014113433 A1 | 3/2016 |

(Continued)

OTHER PUBLICATIONS

Search Report dated May 31, 2019 in related/corresponding DE Application No. 10 2018 133 188.6.

*Primary Examiner* — Kathleen M Walsh
(74) *Attorney, Agent, or Firm* — PATENT PORTFOLIO BUILDERS PLLC (57) ABSTRACT

A distance determination system for a microscope system for coarse focus setting includes a sample stage with a placement surface for holding a displaceable sample carrier, an overview camera with a non-telecentric objective for producing digital images, directed at the sample stage, and an evaluation unit, which includes a storage system storing at least two recorded digital images of the sample stage at different viewing angles, a trained machine-learning-based system for identifying corresponding structures of a sample carrier in the sample stage in the two recorded digital images and a distance determination unit, which determines the distance of a reference point of the sample carrier from a reference point of the overview camera based on the different viewing angles onto the sample stage, a pixel distance of the two recorded digital images with respect to one another using the associated corresponding structures contained in the recorded images.

17 Claims, 5 Drawing Sheets

(51) Int. Cl.
*G02B 21/26* (2006.01)
*G02B 21/06* (2006.01)
*G02B 21/36* (2006.01)

(58) Field of Classification Search
USPC .......................................................... 382/181
See application file for complete search history.

(56) References Cited

U.S. PATENT DOCUMENTS

| | | | |
|---|---|---|---|
| 2005/0185832 A1* | 8/2005 | Douglass | G06V 20/693 |
| | | | 382/133 |
| 2009/0074393 A1 | 3/2009 | Park et al. | |
| 2015/0317507 A1* | 11/2015 | Liebel | G01N 21/253 |
| | | | 348/79 |
| 2017/0301101 A1* | 10/2017 | Stoppe | G01N 21/4795 |
| 2018/0089840 A1 | 3/2018 | Yan et al. | |
| 2018/0191948 A1* | 7/2018 | Zheng | G02B 21/244 |
| 2018/0232879 A1* | 8/2018 | Chang | G06V 20/695 |
| 2019/0353886 A1 | 11/2019 | Iliopoulos et al. | |
| 2020/0184637 A1* | 6/2020 | El-Zehiry | G06T 7/136 |
| 2021/0264214 A1* | 8/2021 | Ozcan | G02B 21/14 |

FOREIGN PATENT DOCUMENTS

| | | |
|---|---|---|
| DE | 102017100262 A1 | 7/2018 |
| JP | H04330411 A | 11/1992 |

\* cited by examiner

DISTANCE DETERMINATION OF A SAMPLE PLANE IN A MICROSCOPE SYSTEM

CROSS-REFERENCE TO RELATED APPLICATIONS

This application claims priority under 35 USC § 119 to German patent application DE 10 2018 133 188.6, filed Dec. 20, 2018, the entire content of which is herein expressly incorporated by reference.

FIELD OF THE INVENTION

Exemplary embodiments of the invention generally relate to a microscope system and in particular to a distance determination system for a microscope system for coarse focus setting, to a corresponding method and to a computer program product.

BACKGROUND

Modern high-performance microscopes are used in an ever-increasing number of branches of industry for analyzing small structures. The examination processes in question are frequently manual ones, but in some cases are fully automated. The requirements in terms of the ergonomics of the microscope systems continually increase. In many cases, it is nowadays a combination of optical and electronic components that are used to observe the small structures not only by optical means, but oftentimes image sensors—for example in the form of image-area sensors—are used to directly electronically further process the observed structures—which are more likely to be referred to as samples in the medical or biological field, for example—and store them or display them on a large monitor. A few difficulties in the case of regular structures, such as multiwell plates, which are frequently used in the medical/biological field, arise due to the fact that it is not always clear at which region of a multiwell plate the objective, which captures only a relatively small region of the sample carrier, is actually directed. In addition, specific distances, such as the one between the objective and a sample plane, are also frequently unknown. The reason for this may be that the bottom thickness of the sample carrier is not known, that different stage inserts having different heights are used, or because a calibration in the z-direction is not precise (direction of the optical axis from the microscope objective to the sample).

Exemplary embodiments of the invention are directed to determining the distance between the objective or stand, on the one side, and the sample or the sample carrier or the holding frame etc., on the other, for example for the purpose of coarse focusing of the microscope system.

SUMMARY OF THE INVENTION

Exemplary embodiments of the invention are directed to a distance determination system for a microscope system, a corresponding method and a computer program product.

In accordance with one aspect of the present invention, a distance determination system for a microscope system is provided. The distance determination system comprises the following: a sample stage with a placement surface for holding a sample carrier. The sample stage may be displaceable along at least one direction of extent of a sample plane, in particular in an x-/y-direction.

The distance determination system may furthermore comprise an overview camera with a non-telecentric objective for producing digital images, in which the overview camera can be directed at the sample stage.

The distance determination system may additionally comprise an evaluation unit that is connected to the overview camera and can include the following subsystems: a storage system for storing at least two recorded digital images of the sample stage at different viewing angles and trained machine-learning-based system (ML system) for identifying corresponding structures of a sample carrier that is placed into the sample stage in the two recorded digital images, wherein the trained machine-learning-based system comprises a trained reference model, which is trainable by way of a set of annotated training images of sample carriers in a manner such, and the trained machine-learning-based system is thus adapted such, that corresponding structures in the at least two recorded digital images are able to be associated with one another.

In addition, the distance determination system may comprise a distance determination unit, which is adapted for determining the distance of a reference point of the sample carrier from a reference point of the overview camera based on the different viewing angles onto the sample stage and a pixel distance of the two recorded digital images with respect to one another using the associated corresponding structures contained therein.

In accordance with a different aspect of the present invention, a computer-implemented method of a microscope is provided. The microscope system may comprise a sample stage having a placement surface for holding a sample carrier. The sample stage may here be displaceable along at least one direction of extent of a sample plane. The microscope system may furthermore comprise an overview camera with a non-telecentric objective for producing digital images, wherein the overview camera may be directed at the sample stage. The method comprises the following: storing at least two recorded digital images at different viewing angles with respect to the sample stage and associating corresponding structures in the at least two recorded digital images by using a trained machine-learning-based system for identifying corresponding structures of a sample carrier that is placed into the sample stage in the two recorded digital images, wherein the trained machine-learning-based system comprises a trained reference model, which is trainable by way of a set of annotated training images of sample carriers in a manner such that the trained machine-learning-based system is thus adapted such that corresponding structures in the at least two recorded digital images are associated with one another.

As a supplementary addition, the method may comprise determining a distance of a reference point of the sample carrier from a reference point of the overview camera based on the different viewing angles and a pixel distance of the two recorded digital images with respect to one another using the associated corresponding structures contained therein.

It should be mentioned for the sake of completeness that, in addition to the sample carrier that is placed into the sample stage, the distance to the sample stage, a holding frame, placed into the sample stage, for a sample carrier or a sample region may also be determined.

Furthermore, it is possible for embodiments to be implemented in the form of a corresponding computer program product, which can be accessed using a computer-usable or computer-readable medium and which has program code for use by, or in conjunction with, a computer or instruction execution system. In the context of this description, a computer-usable or computer-readable medium can be any apparatus that includes means for storing, communicating, transmitting or transporting the program for use by, or in conjunction with, an instruction execution system, a corresponding apparatus or equipment.

The distance determination system for a microscope system and the corresponding computer-implemented method have a number of advantages and technical effects:

The recordings taken by the overview camera, which are represented on a monitor, can easily represent overview images of the sample carrier. Amongst other things, this makes improved navigation over a sample region possible. In particular, it is possible to show in the overview image which region of the sample specifically is located over the selected objective. In this way, position indication is easily made possible. In other words, knowing the skirt height of a multiwell sample carrier also makes exact positioning and navigation with respect to the wells of the sample carrier possible.

Based on this position indication, the sample stage can be moved using a selection overview image in a manner such that the selected region is located over the capturing region of the selected objective of the microscope system, resulting in an improved and simplified navigation within the sample stage.

In addition, it is thus easily possible to determine the position, distances and areas in the overview image in absolute values—for example in millimeters—so as to perform a measurement. In addition, the height (z-position) of the sample plane with respect to the sample stage is ascertainable, as a result of which clear and fast focusing of the respective microscope objective is made possible if sample carriers of different base heights or skirt heights are used interchangeably.

Furthermore, the use of a trained machine-learning-based system (ML system) within the evaluation unit extends significantly beyond the function of conventional autofocus systems. Especially when multiwell plates are used as sample carriers, there are a large quantity of identical or very similar structures for which conventional systems based on triangulation frequently fail because they are susceptible in respect of regularly repeating (periodic) structures, strong background signals, reflections etc. In addition, conventional autofocus systems of microscope systems practically always operate on the basis of microscope images recorded using the microscope objectives rather than overview images of an overview camera.

By contrast, in the concept proposed here, the machine-learning-based system is used to perform pixel-oriented classification of individual pixels of the recorded images, with the result that each pixel of a recorded digital image is associated with a specific class of pixels or image points. In this way, for example, all image points that belong to a well of a multiwell plate can be classified as "well pixels" (pixels belonging to a well). Other pixel classes can be used to identify the sample stage, a sample frame, a background etc. One possibility for ascertaining a machine-learning-based displacement vector of the sample carrier (or of the sample stage) is, for example, to set all pixels that do not belong to the class "sample pixel" to "0", while all pixels of the class "sample pixel" are set to "1". In this way, 0/1 contrast images (black/white) are obtained with the use of the ML system, which can be correlated in their respective entirety by the ML system, with the result that, by determining an optimum of a corresponding (target) function, a displacement vector from one recorded image to another recorded image of the same sample carrier is made possible, in particular using the distance determination unit. Further typical pixel classes can be the background, the sample stage, a stage insert or holding frame, structures on the sample carrier or sample regions.

Besides the classification of individual pixels, the use of the machine-learning-based system also makes detection of corresponding structures on the two recorded images possible.

The overview camera may be easily positioned such that it can capture the entire sample region. It can be, but does not have to be, integrated in the objective turret or be positioned outside the objective turret as a technical add-on element. This would, under certain circumstances, be associated with a different optical axis than that of the objective microscope; the overview camera could thus also be directed obliquely from below at the sample carrier without the ML-based image analysis system failing. Additionally, it is also possible—with certain limitations—to position the overview camera above the sample carrier (i.e., the sample stage). Furthermore, mirrors can be used to reflect one of the sides of the sample carrier towards the overview camera. Overall, multifarious design options are available for positioning the overview camera.

It may additionally be used for the identification of samples—using barcodes, QR (quick response) codes or OCR (optical character recognition) methods—provided such symbols are discernible on the sample carrier.

The comparatively low requirements with respect to the additional hardware of the microscope system—in particular a sample stage that is displaceable vertically to the optical axis of the microscope system and a non-telecentric overview camera (or two)—turn this system into an attractive option both from a user's point of view and that of the manufacturer. Consequently, there are three options for producing the relative movement of the overview camera: (a) moving the sample stage, (b) moving the overview camera and (c) using a second, fixedly mounted overview camera. The last possibility in particular can be of interest for retrofitting microscope systems that have already been installed.

The ML system used in the image analysis system makes possible more robust correspondence matching between two recorded digital images of the overview camera than conventional methods. In addition, it can be used seamlessly for any desired sample carriers, in particular including different transparent multiwell plates. In this way, trained personnel will also be able to more easily operate high-performance microscope systems.

Due to the determined displacement vector between the two recorded images, it is then possible to calculate the distance between the sample plane and, for example, the lens plane of the microscope objective or the image plane of the microscope objective using known methods (parallax effect) and known distances of reference points of the overview camera from a reference point of the objective of the microscope system.

Exemplary embodiments of the invention make possible a further advantageous effect for the case in which the overview camera does not capture the entire sample carrier but captures the latter for example in 2, 3 or more partial images. This is true in the case of particularly large sample carriers. Due to the fact that the distance is adjustable, it is easily possible to stitch together the partial images without content-related image matching for an overview display on a monitor. If—without knowing the distance—an image recognition system must be used for this step, misinterpretations and mismatches can easily occur during stitching.

Furthermore, by using the reference point of the sample carrier, each plane of the sample carrier may be used as a reference, that is to say including the sample plane. In addition, a larger area of application with respect to the evaluation possibilities and the training spectrum of the machine-learning-based system is thus obtained.

It is furthermore advantageous that an active and automated collision avoidance between the sample stage and the objective may be implemented due to the knowledge of the distance. In this way, damage to the microscope system can be avoided.

Further exemplary embodiments of the inventive concept of the distance determination system, which may similarly apply accordingly to the method, will be introduced below.

According to an advantageous exemplary embodiment of the distance determination system, the trained machine-learning-based system may be adapted for classifying individual pixels of the at least two recorded images. The classification can be effected with respect to the following— or further—criteria: sample pixels, background pixels, sample carrier pixels, cover-slip pixels, text pixels, edge pixels or sample stage pixels. This makes segmentation of the recorded images possible.

In other words, if, for example, all the pixels that can be associated with samples are represented as a logical "1" and all the pixels that are not identified or classified as belonging to a sample in the recorded digital image are thus represented as a logical "0", the result is a black-and-white image in which the samples for example are represented in black (logical "1") and everything else in "white" (logical "0"). It is possible with this preparation and a pattern comparison between two recorded digital images to seamlessly ascertain a displacement vector and thus a displacement path from corresponding patterns or their entirety within the two recorded digital images.

According to a further exemplary embodiment of the distance determination system, the trained machine-learning-based system may be adapted for outputting a reference coordinate of one of the corresponding structures. A reference coordinate can here be, for example, a calculated center of a well of a (multiwell) sample carrier, a specific point of a boundary edge of a captured object, etc. The displacement vector between the two images can be seamlessly ascertained in pixels by way of the respective reference coordinates of two corresponding structures in the two recorded images.

According to a supplementary exemplary embodiment of the distance determination system, it is also possible for the class of the reference coordinate of one of the corresponding structures to be output. The class thus ascertained can be used as an additional input parameter for the optimization function for the optimization task for determining the distance, as a result of which ambiguity can be reduced.

According to a further supplementary exemplary embodiment of the distance determination system, the sample stage may be illuminated using an illumination means. It would also be possible for the sample stage to be illuminated in this way. Consequently, the proposed concept is of use for both incident-light and transmitted-light microscopes.

According to a permitted exemplary embodiment of the distance determination system, the sample carrier may be a multiwell plate. The distance between the bottom side of the multiwell plate or in particular the lower plane of the sample wells and the bottom side of a placement frame of the plate varies in particular in this type of sample carriers. This is caused by a different skirt height or thickness of the bottom of the multiwell plate. For this type of sample carrier plates, exemplary embodiments of the invention allow for calibration with respect to the different types of multiwell plates having different skirt heights.

According to a further advantageous exemplary embodiment of the distance determination system, it may also be adapted for determining the distance of the sample stage to a reference point of the overview camera. By knowing the sample height—that is to say the distance 'reference point of the camera to the sample plane'—and knowing the stage height—distance 'reference point of the camera to the bottom of the sample stage'—it is possible to seamlessly determine the skirt height of a multiwell plate.

According to a supplementary advantageous exemplary embodiment of the distance determination system, it may also comprise a drive unit for changing a distance of the sample stage from the overview camera. By knowing the position (corresponding to a distance) of the overview camera with respect to a reference point of a microscope objective, it is possible for the height of the sample stage (z-direction along the optical axis from the microscope objective in the direction of the sample carrier) to be set in automated fashion such that coarse focusing with respect to the microscope objective is performed automatically.

According to an alternative exemplary embodiment of the distance determination system, the overview camera or an optical element may be positioned at an objective turret of the microscope system. Instead of obliquely directing the overview camera at the sample stage (which is certainly possible), which is accomplished by the overview camera being positioned next to the objective turret, perpendicular directing is likewise possible when the overview camera is placed in the objective turret such that it can thereby become active perpendicularly under the sample stage.

The optical element mentioned may also be a mirror or prism through which the rays are directed from the sample carrier onto the overview camera. This way offers greater design freedom in terms of the positioning of the overview camera.

According to one possible exemplary embodiment of the distance determination system, a microscope objective—in particular one having a relatively low magnification—together with an image sensor—or the image sensor of the microscope system—may be used as the overview camera. However, positioning the overview camera independently of the objective turret seems to make more sense because in this way, all objectives continue to be utilizable and no space will be necessary in the objective turret for the overview camera. In this way, retrofitting microscope systems already being used would also be possible.

According to one advantageous exemplary embodiment of the distance determination system, the machine-learning-based system is used for supervised and/or unsupervised learning. It may be used for segmenting pixels of the two images and/or detecting structures in the two images. In addition, it has proven advantageous if the machine-learning-based system is a neural network—or a support vector machine, for example. The neural network may be trained for example using supervised learning (or unsupervised learning). The training then permits classification of pixels of the recorded images and/or detection of specific structures. With respect to the classifying operation, multi-class algorithms or one-class algorithms can be used. The neural network may be embodied as a deep neural network, as a CNN (convolutional NN) or an RNN (recursive NN).

In the case of unsupervised learning, algorithms such as deep autoencoder, one-class classification, or novelty detection may be used. In principle, it is possible to use any learning system that permits detection and determination of corresponding or unique structures in the recorded digital images.

According to a further advantageous exemplary embodiment of the distance determination system, the pixel distance of the two images that have been segmented by pixel-wise classification may be determined using optimization of a target function that has in each case a plurality of corresponding structures of the two images, wherein the target function indicates the pixel distance. Moreover, a detection function can also be used for finding individual/unique structures that can be used, and/or the coordinates of which can be used, as input data for the optimization function. This means that integrated consideration of the digital images is also used. An optimization function that may be used here is, for example, algorithms such as centroid distance average values of corresponding structures, an Intersection over Union algorithm or a determination of Jaccard coefficients etc. Typically, an optimum (maximum or minimum) for the respective target function is determined.

A supplementary, advantageous exemplary embodiment of the distance determination system may comprise associating corresponding structures in the at least two recorded digital images by using a trained machine-learning-based system for identifying corresponding structures of the sample stage and/or of a holding frame that has been placed into the sample stage or of a pure sample region in the two recorded digital images with respect to the structures. In this way, it is not only the sample itself but also surrounding structures that are evaluable for a respective distance determination.

According to a further advantageous exemplary embodiment of the distance determination system, the different viewing angles can be caused by a relative movement between the sample stage and the overview camera. In this way, the sample stage could remain fixed in the x-/y-direction and the overview camera would change its position—for example by a fixed known value for example perpendicular to the optical axis of the microscope system. One option would be to displace the sample stage, another would be to displace the camera.

According to a further alternative exemplary embodiment of the distance determination system, the different viewing angles are produced by recordings from two overview cameras located with an offset with respect to one another. These could be taken at the same time, and relative movements between the sample stage and the one overview camera would not be necessary. This would make possible a simpler, more robust, less susceptible and relatively low-maintenance mechanical construction. In addition, the two overview images could be taken exactly at the same time point, as a result of which the samples would also be in exactly the same state. A time-based change of the samples could be ruled out.

BRIEF DESCRIPTION OF THE DRAWING FIGURES

It should be noted that exemplary embodiments of the invention can be described with respect to different implementation categories. In particular, some exemplary embodiments are described with respect to a method, while other exemplary embodiments may be described in the context of corresponding apparatuses. Notwithstanding the above, it will be possible for a person skilled in the art to identify and combine possible combinations of the features of the method and possible feature combinations with the corresponding system from the prior and subsequent description—unless otherwise noted—even if they belong to different claim categories.

Aspects that have already been described above and additional aspects of the present invention are evident, inter alia, from the exemplary embodiments described and from the additional further concrete configurations described with respect to the figures.

Preferred exemplary embodiments of the present invention will be described by way of example and with respect to the following figures.

DETAILED DESCRIPTION

In the context of this description, conventions, terms and/or expressions should be understood in the following way:

The term "distance determination system" in the context of this document refers to an automated system for determining a distance that is based on machine learning, in particular a classification system for recorded images of a microscope system for image segmentation and displacement vector determination. The distance determination system can be integrated with its individual components into a microscope system and/or use subcomponents of the microscope system which are already present.

The term "coarse focus setting" here refers to an automated setting of the distance between a reference point on the objective of the microscope system and a sample plane of a sample carrier located on a sample stage. After a coarse setting by way of the concept described here, further fine focusing by the corresponding objective can be performed using further control systems.

The term "sample stage" within the context of this document refers to a stage having a frame for holding a sample carrier that is positioned—primarily in the transmitted-light method—over an objective of a microscope system. The sample stage can advantageously, for example, be displaced normally to the optical axis of the microscope system.

The term "sample carrier" here describes an element for holding samples that are to be examined using a microscope system. This element can be, for example, multiwell plates (typical size 13×10 cm) that can hold a multiplicity of samples in depressions or wells at the same time. The lowermost point of the depression in this case typically represents the sample plane. Moreover, other sample carriers such as conventional slides or chamber slides, both having a typical size of 75×24 mm, or Petri dishes may also be used, which can be used in incident light or transmitted light.

The term "overview camera" in the context of this document refers to a camera that can be mounted at or in the microscope system in addition to the microscope objectives of a microscope system to record an overall image of the sample carrier that typically transmits radiation. The overview camera here typically includes an image sensor; a non-telecentric objective is additionally used in the overview camera (a non-telecentric objective is an objective whose entrance and exit pupils are not at infinity).

The term "digital image" here describes a digital representation of a recorded image that was captured by an image sensor. Since this involves digital information, the digital image—or the digital representation thereof—can be stored and processed further in or on electronic media, for example using a machine-learning-based system.

The term "machine-learning-based system" describes a hardware-supported or software system from the field of artificial intelligence, which is adapted for learning from examples so as to associate—without procedurally specified and manually produced program instructions—for example contents of images or the partial regions thereof with abstract terms—such as "good" or "poor" or meaning constructs—for example segmentation of image contents. In general terms, mapping of input data to output data is learned.

The term "training of the learning system" means that, for example, a machine learning system adjusts, by way of a multiplicity of exemplary images, parameters in, for example, a neural network by evaluating the exemplary images so as to associate after the training phase even unknown images with one or more categories with which the learning system has been trained. In addition, it is possible, due to a detection of specific structures, to ascertain the coordinates thereof in the images. The exemplary images are typically annotated—that is to say provided with metadata—in order to provide the desired results based on the input images. Training can also be geared to a classification of individual pixels in the recorded images, as a result of which image segmentation can be attained. The result of the training phase is a trained reference model that can map from input images to an associated class, a semantic segmentation of the input image or to coordinates of relevant structures/objects.

The term "machine learning" is a fundamental term of artificial intelligence, wherein, for example, statistical methods inter alia are used to give computer systems the ability to "learn". For example, specific behavior patterns within a specific scope of tasks are optimized. The methods enable the systems of machine learning to analyze data without the need for any explicit procedural programming for this purpose. For example, a CNN (convolutional neural network) is one example of a system for machine learning, in particular a network of nodes, which act as artificial neurons, and artificial connections between the artificial neurons—also known as links—wherein parameters—for example weight parameters for the connection—can be associated with the artificial connections. During the training of the neural network, the weight parameters of the connections automatically adapt based on input signals for producing a desired result. In the case of supervised learning, the images provided as input values are supplemented by metadata (annotations) in order to learn a desired output value in this way. In the case of unsupervised learning, such annotations are not necessary.

In this connection, mention should also be made of recursive neural networks (RNN), which likewise represent in each case a type of deep neural network, in which the weight adaptation is recursive such that a structured prediction relating to input data of variable magnitude can be produced. Typically, such RNNs are used for sequential input data. Exactly as in the case of CNNs, back propagation functions in addition to the predictive weight adaptation are also used here. RNNs can also be used in image analysis.

The term "classifying" here means that specific semantics can be given to individual pixels of a recorded digital image—such as a sample carrier—by way of the trained machine-learning-based system, that is to say they can be individually associated in each case with a class. In this way, regions of the sample carrier, of the samples, of the sample stage etc. can be differentiated. Segments of the image are produced due to this differentiation. This produces a segmented image.

The term "multiwell plate" refers to a sample carrier apparatus having a plurality of depressions (wells), the bottoms of which are substantially located in one plane and thus designate the sample plane. Various multiwell plates can have skirts (frames that extend around them) of different height—depending on the manufacturer—with which they are placed into a sample frame. The concept of distance determination introduced here unfolds many advantages in the case of changing multiwell plates.

Figure 1:
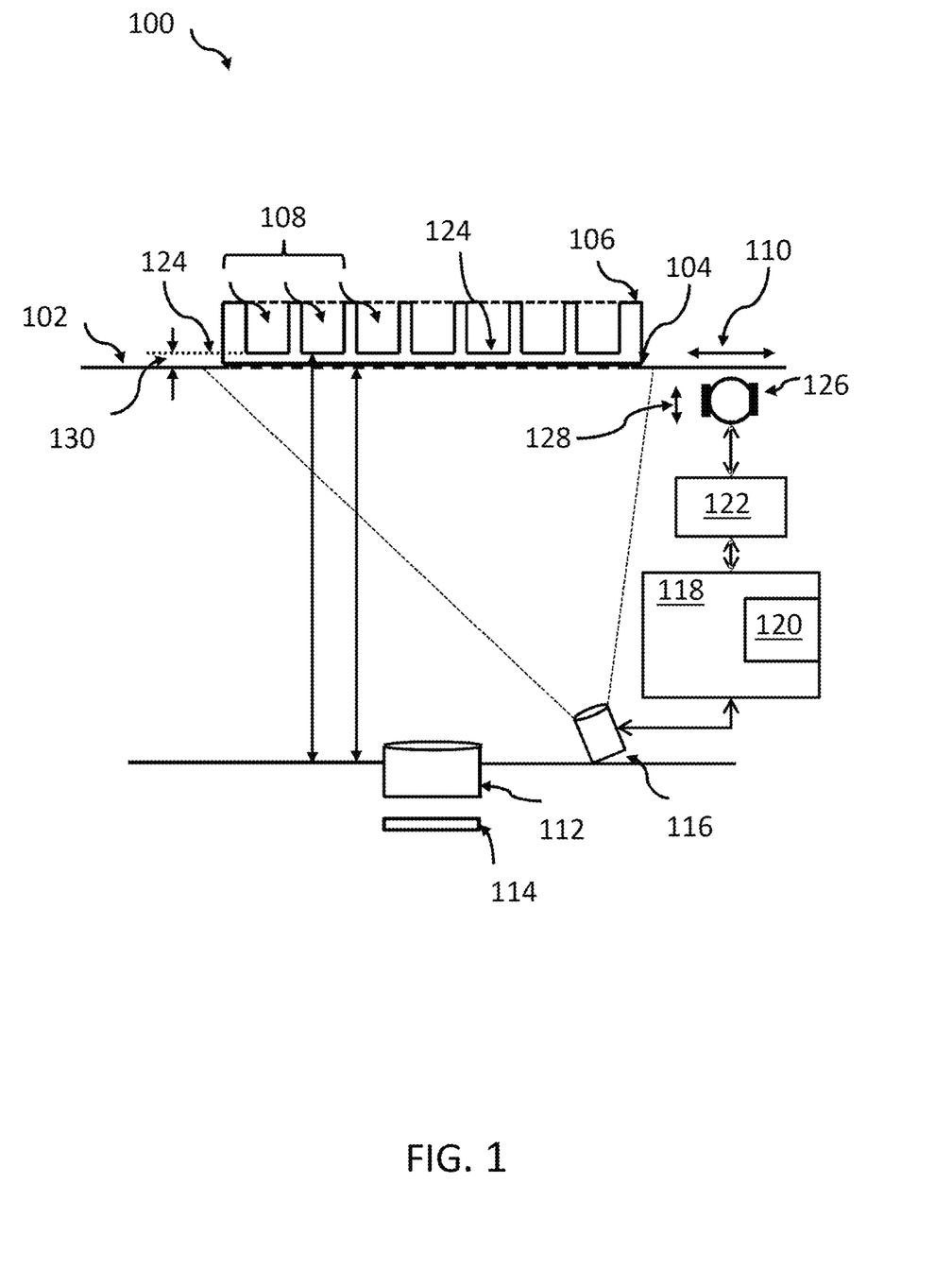
FIG. 1 illustrates a block diagram of an exemplary embodiment of the inventive distance determination system.

A detailed description of the figures follows. It should be understood here that all details and instructions are illustrated schematically in the figures. Illustrated first is a block diagram of an exemplary embodiment of the distance determination system according to the invention for a microscope system. Further exemplary embodiments and exemplary embodiments for the corresponding method will be described below:

FIG. 1 illustrates a block diagram of an exemplary embodiment of the inventive distance determination system 100 for a microscope system, for example, for coarse focus setting—in particular of the distance "sample plane to microscope objective"—of the microscope system. The distance determination system 100 here includes the following: a sample stage 102 having a placement surface 104 for holding a sample carrier 106. The sample carrier 106 can be a multiwell sample carrier 106 having a plurality of sample compartments 108 or wells (in view), of which only the three on the left are provided with the reference sign 108. The plane of the sample stage 102 is typically normal to an optical axis of the microscope system. In addition, the sample stage 102 can be displaceable along at least one of its directions of extent in order to allow different viewing angles of the overview camera 116 onto the sample stage 102. In a conventional design of the microscope system, in which the z-axis corresponds to the optical axis of the microscope system, the sample stage is displaceable in the x-direction and/or y-direction, indicated by the arrow 110. Moreover, the sample stage 102 is displaceable in the z-direction in terms of its height with respect to the microscope objective 112. An image sensor 114 is illustrated schematically below the microscope objective 112. The image that is recorded by the image sensor 114 of the microscope objective 112 can be displayed on a monitor (not illustrated) using known technologies.

The overview camera 116 includes a dedicated image sensor (not illustrated) with a non-telecentric objective for producing digital images. Here, the overview camera 116 is not necessarily directed along the optical axis of the microscope system onto a bottom side (or top side) of the sample stage 102.

Alternatively, the different viewing angles of the overview camera 116 at the sample stage 102 can be obtained by a displaceability of the overview camera 116 or by way of recordings of the sample stage 102 with the sample carrier 106 using a second overview camera.

Furthermore, the distance determination system 100 includes an evaluation unit 118, which is connected to the overview camera(s) 116 and for its part includes the following elements: a storage system (not illustrated) for storing at least two recorded digital images at different positions of the sample stage 102 (that is to say the sample stage is displaced between the recordings in at least one of its horizontal extents) and a trained machine-learning-based system 120 for identifying corresponding structures of the sample stage and/or of a sample carrier that is placed into the sample stage in the two recorded digital images, wherein the trained machine-learning-based system 120 has a trained reference model that is trainable by way of a set of annotated training images of sample carriers—and thus implicitly of the sample stage—in a manner such, and the trained machine-learning-based system 120 is thus adapted such, that corresponding structures in the at least two recorded digital images are able to be associated with one another.

In addition, the distance determination system 100 includes a distance determination unit 122, which is connected to the machine-learning-based system 120 and is adapted for determining the distance of a reference point of the sample carrier from a reference point of the overview camera 116 based on the different viewing angles onto the sample stage 102 for the two recorded images, a pixel distance of the two recorded digital images with respect to one another using the associated corresponding structures contained therein. It is then possible to analytically ascertain a distance—expressed for example in millimeters—from the number of the pixels between two corresponding structures—or the reference points thereof. The calculation method of the distance determination unit 122 here uses the parallax effect. It would be advantageous if the reference point were located on a section plane of the sample carrier 106, with the result that the sample carrier 106 and the section plane would in each case be located or extend perpendicular to the optical axis of the microscope system.

The distance determination unit 122 can furthermore be connected to a control/drive unit 126 so as to displace the sample stage 102 vertically—i.e., in the z-direction—as indicated by the arrow 128. This does not affect the possible movements of the sample stage 102 in a plane normal to the z-direction. The distance 130 between the placement surface 104 of the sample carrier 106 and the sample plane 124 can vary from sample carrier to sample carrier (depending on the type).

For the sake of completeness, it should be noted again that alternatives to a displacement of the sample stage 102 are also suitable for recordings of images at different viewing angles. For example, it may be the case that it is not the sample stage 102 that is moved but the overview camera 116. As a further option, the aforementioned second overview camera (not illustrated) could also be used. The latter could be located, for example, on a line extending through the two overview cameras and is perpendicular to the optical axis of the microscope system.

Figure 2:
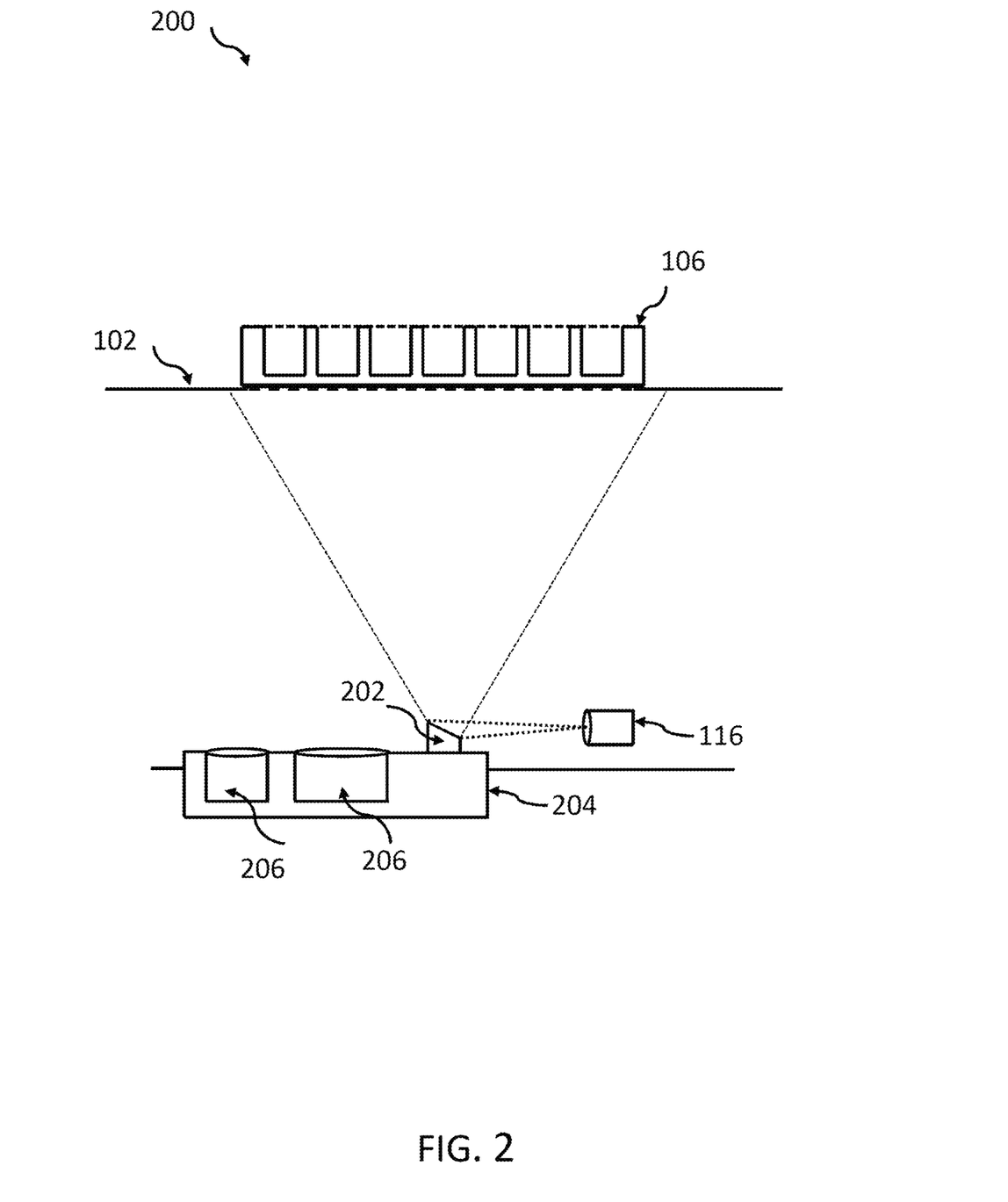
FIG. 2 illustrates a block diagram of an alternative construction of the inventive concept.

FIG. 2 presents a block diagram 200 of an alternative construction—shown with a reduced number of elements—of the distance determination system 100. What is of importance here is basically that the overview camera 116 is not directed at the sample carrier 106 directly from (obliquely) below but by way of a mirror 202, which deflects the rays that are incident from the sample carrier 106 or from the sample stage 102 so as to direct them onto the overview camera 116.

The mirror 202 can here be provided at a position of an otherwise present microscope objective 206 in the objective turret 204 or next to it. Alternatively, other positioning options of the mirror 202 and thus of the overview camera 116 exist. By using the mirror 202—or alternatively a prism, possibly with further optical elements—the positioning of the overview camera 116 is characterized by a relatively large design freedom.

Figure 3:
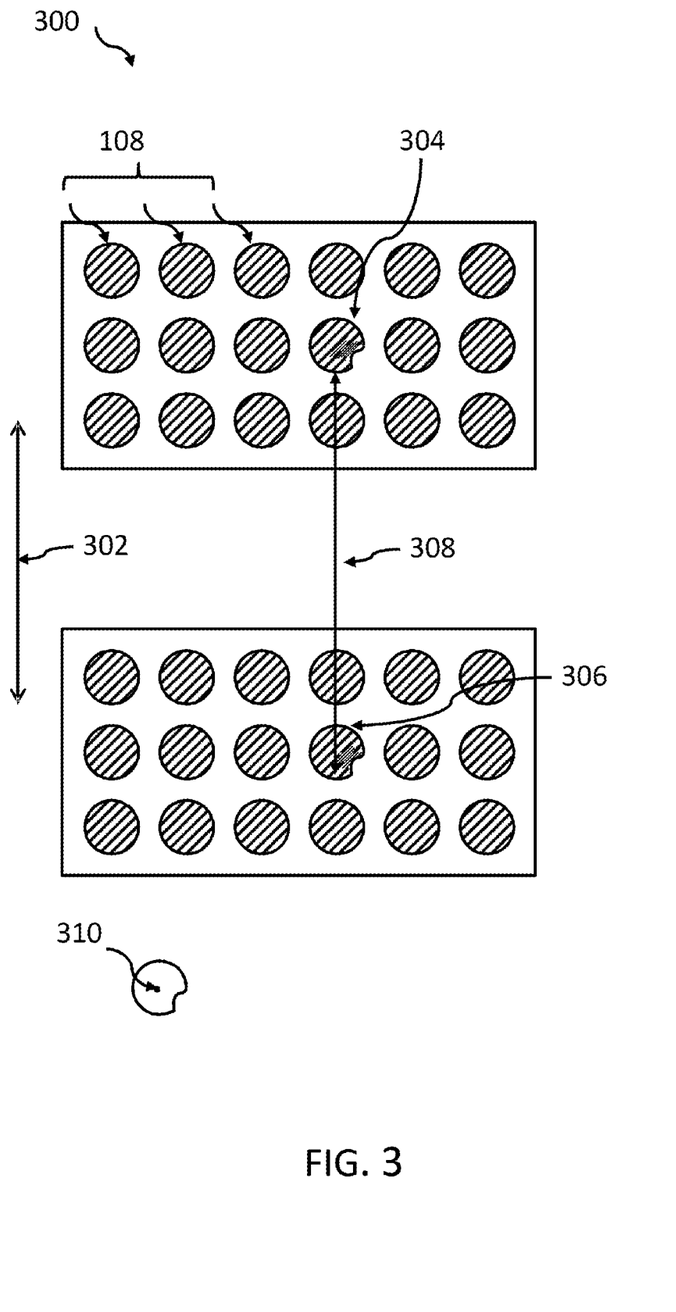
FIG. 3 schematically illustrates recorded images of a sample carrier with a reference point of a structure that has been selected as an example.

The upper and middle portions of FIG. 3 respectively illustrate two schematically recorded digital images which are displaced with respect to one another, which is indicated by the arrow 302. The striped circles in both the upper and middle portions of FIG. 3 represent idealized sample wells 108. In real recordings, these depictions of the samples or sample wells 108 would have a significantly more irregular appearance, as is shown by way of example in the case of the corresponding structures 304 and 306. The machine-learning-based system can associate the corresponding structures 304, 306 of the entirety of the structures in the recorded digital images—after training and classification of the pixels of the images that is based thereon—with one another, with the result that a displacement of the upper image with respect to the middle image—illustrated by the arrow 308—can be determined by way of an optimization function of the distance determination unit.

Alternatively, it is additionally possible to determine, by application of an Intersection over Union method or by determination of Jaccard coefficients, the entirety of the structures in the images according to the upper and middle portions of FIG. 3 and to determine therefrom a displacement vector or distance.

As already mentioned above, the machine-learning-based system can perform classification of individual pixels of the recorded images such that all pixels belonging to a sample region (illustrated in structured form) are presented for example as a logical "1" while all other classified pixels of the recorded images are presented for example as a logical "0". In this way, one of the stated algorithms can be used to determine a displacement vector 308 with relatively little effort.

The lower portion of FIG. 3 shows an example of a reference point 310 of an identified structure, which in this case assumes the centroid of the structure. Alternatively, any other reference point—for example the point of the lowermost edge—can be used.

Figure 4:
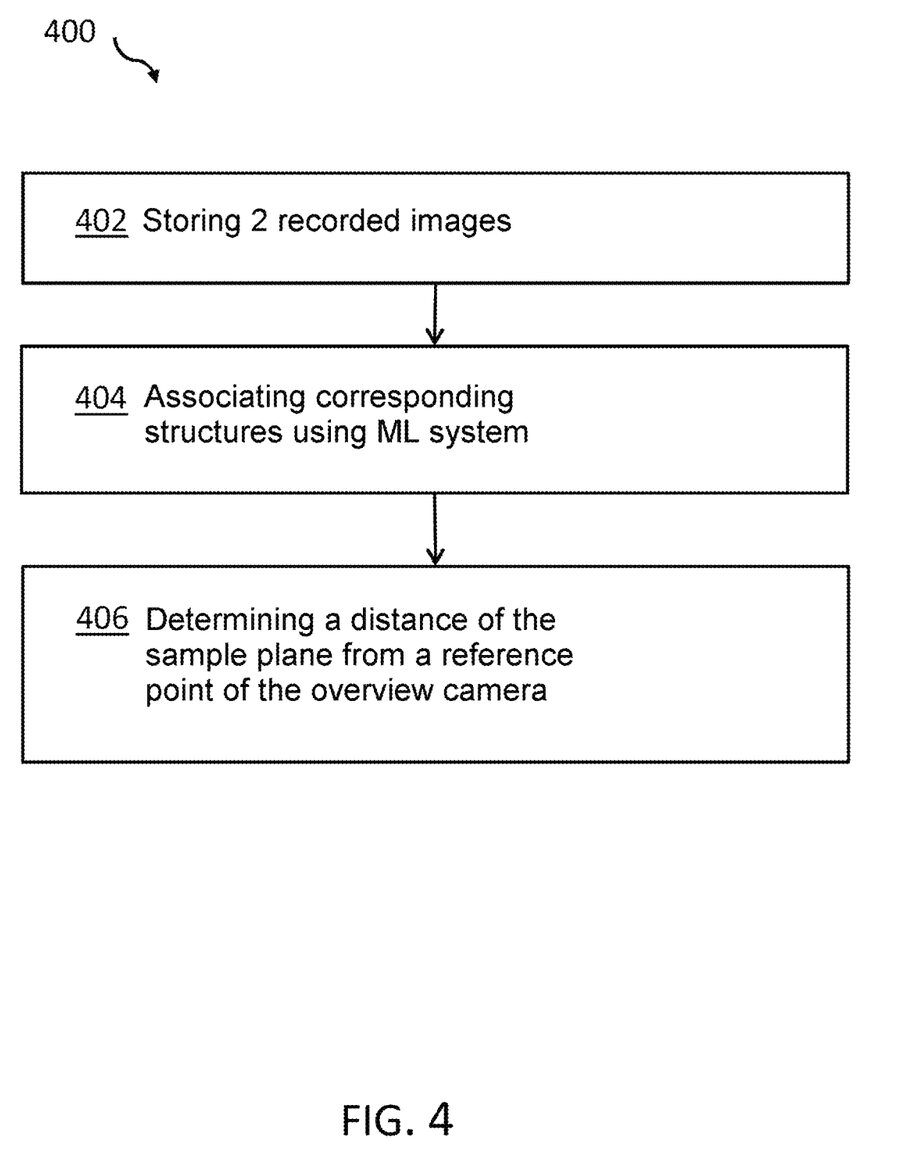
FIG. 4 illustrates a block diagram of the computer-implemented method for coarse focus setting of a microscope.

FIG. 4 illustrates a schematic flowchart of the computer-implemented method 400 for example for coarse focus setting of a microscope. The microscope system here includes a sample stage with a placement surface for holding a sample carrier, which is displaceable (horizontally) along at least one direction of extent of a sample plane. The microscope system here, too, includes an overview camera with a non-telecentric objective for producing digital images. The overview camera is typically directed at the sample stage. The method includes the following activities: Storing 402 at least two recorded digital images of the sample stage at different viewing angles.

After the recorded digital images have been stored 402, associating 404 of corresponding structures in the at least two recorded digital images is effected by using a trained machine-learning-based system for identifying corresponding structures of the sample stage and/or of a sample carrier that has been placed into the sample stage in the two recorded digital images. The machine-learning-based system here refers to a trained reference model that was trained by way of a set of annotated training images of sample carriers. In this way, the distance determination system is adapted using the trained machine-learning-based system and the distance determination unit—using optimization— such that it determines a distance in the at least two recorded digital images by way of corresponding structures.

This is accomplished in the last—but not terminating—step of the method 400, in which determining 406 of a distance of a reference point of the sample carrier from a reference point of the overview camera is effected based on the different viewing angles onto the sample stage 102 of a known displacement of the sample stage and a pixel distance of the two recorded digital images with respect to one another using the associated corresponding structures contained therein.

Figure 5:
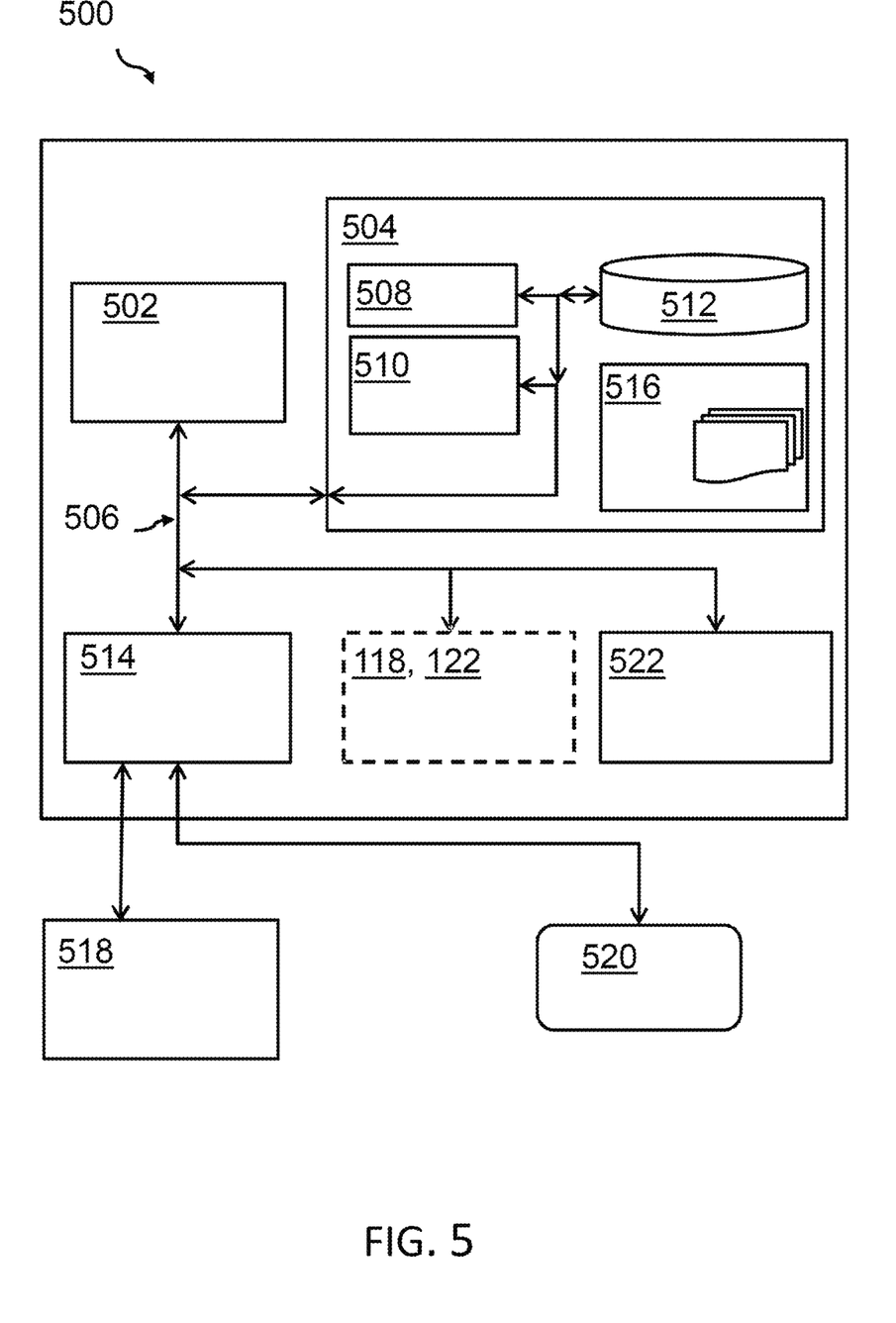
FIG. 5 illustrates a block diagram of a computer system that is suitable as a process system for the method according to FIG. 4.

FIG. 5 presents a block diagram of a computer system 500, which can be used as a system for performing the abovementioned method. In addition, the computer system 500 can include at least parts of the evaluation unit 118 and the distance determination unit 122. Embodiments of the concept proposed here can be used in principle with practically any type of computer, irrespective of the platform used therein, for storing and/or executing program codes. FIG. 5 presents an example of a computer system 500, which is suitable for executing program codes in accordance with the method that is introduced here. It is likewise possible that a computer system which is already present in the microscope system and which may have to be expanded is used at least for partially performing the method introduced here.

The computer system 500 includes a plurality of generally utilizable functions (general-purpose functions). The computer system can here be a tablet computer, a laptop/notebook computer, another portable or mobile electronic device, a microprocessor system, a microprocessor-based system, a smartphone or a computer system with specifically set-up functions. The computer system 500 can be set up for executing instructions that are able to be executed by the computer system—such as program modules—which can be executed to implement functions of the concepts which are proposed here. To this end, the program modules can have routines, programs, objects, components, logic, data structures etc. to implement specific tasks or specific abstract data types.

The components of the computer system can include the following: one or more processors or processing units 502, a storage system 504 and a bus system 506 that connects different system components including the storage system 504 and the processor 502. The computer system 500 typically includes a plurality of volatile or non-volatile storage media which are accessible by the computer system 500. Data and/or instructions (commands) of the storage media can be stored in the storage system 504 in a volatile form—such as in a RAM (random access memory) 508—so as to be executed by the processor 502. The data and instructions realize individual or a plurality of functions or method steps of the concept that has been introduced here. Further components of the storage system 504 can be a permanent memory (ROM) 510 and a long-term memory 512, in which the program modules and data (reference sign 516) can be stored.

The computer system has a series of dedicated apparatuses (keyboard 518, mouse/pointing device (not illustrated), screen 520 etc.) for communication purposes. These dedicated apparatuses can also be combined in a touch-sensitive display. A separately provided I/O controller 514 ensures seamless data exchange with external devices. A network adapter 522 is available for communication using a local or global network (LAN, WAN, for example the Internet). The network adapter can be accessed by other components of the computer system 500 by way of the bus system 506. It is to be understood here that—although this is not illustrated—other apparatuses can also be connected to the computer system 500.

Moreover, at least parts of the distance determination system 100 (cf. FIG. 1) can be connected to the bus system 506, such as the image sensor 114 and/or the evaluation system 118. The digital image data of the image sensor 114 can also be prepared by a separate pre-processing system (not illustrated).

The description of the various exemplary embodiments of the present invention was illustrated for the sake of providing better comprehension, but it does not serve for directly limiting the inventive concept to the exemplary embodiments. Further modifications and variations are apt to the person skilled in the art. The terminology used here was selected to best describe the fundamental principles of the exemplary embodiments and to make them easily accessible to the person skilled in the art.

The principle introduced here can be embodied in the form of a system, a method, combinations thereof and/or a computer program product. The computer program product can in this case have a (or a plurality of) computer-readable storage medium/media having computer-readable program instructions to cause a processor or control system to perform various aspects of the present invention.

Suitable media used as transmission medium are electronic, magnetic, optical, electromagnetic, infrared media or semiconductor systems, for example SSDs (solid state device/drive), RAM (random access memory) and/or ROM (read-only memory), EEPROM (electrically erasable ROM) or any desired combination thereof. Further transmission media are also propagating electromagnetic waves, electromagnetic waves in waveguides or other transmission media (for example light pulses in optical cables) or electrical signals transmitted in wires.

The computer-readable storage medium can be an embodied apparatus that holds or stores instructions for use by an instruction execution device. The computer-readable program instructions described here can also be downloaded to a corresponding computer system, for example as a (smartphone) app from a service provider via a cable connection or a mobile radio network.

The computer-readable program instructions for executing operations of the invention described here can be machine-dependent or machine-independent instructions, microcode, firmware, status-defining data or any source code or object code that is written for example in C++, Java or in similar or in conventional procedural programming languages such as for example the programming language "C" or similar programming languages. The computer-readable program instructions can be executed completely by a computer system. In some exemplary embodiments, this may also involve electronic circuits such as for example programmable logic circuits, field-programmable gate arrays (FPGA) or programmable logic arrays (PLA) that execute the computer-readable program instructions by using status information of the computer-readable program instructions to configure or individualize the electronic circuits according to aspects of the present invention.

Moreover, the invention introduced here is illustrated with reference to flowcharts and/or block diagrams of methods, apparatuses (systems) and computer program products in accordance with exemplary embodiments of the invention. It should be noted that practically any block of the flowcharts and/or block diagrams can be realized as computer-readable program instructions.

The computer-readable program instructions can be made available to a general-purpose computer, a special computer or a data processing system that is otherwise programmable to create a machine such that the instructions that are executed by the processor or the computer or other programmable data processing apparatuses create means for implementing the functions or processes that are illustrated in the flowchart and/or block diagrams. The-computer-readable program instructions can also correspondingly be stored on a computer-readable storage medium.

In this context, any block in the illustrated flowchart or the block diagrams can represent a module, a segment or portions of instructions representing a plurality of executable instructions for implementing the specific logic function. In some exemplary embodiments, the functions illustrated in the individual blocks can be performed in a different order, possibly even in parallel.

The illustrated structures, materials, sequences and equivalents of all means and/or steps with associated functions in the following claims are intended to apply all structures, materials or sequences, as expressed by the claims.

REFERENCE SIGNS

100 Distance determination system
102 Sample stage
104 Placement surface
106 Sample carrier
108 Sample compartments, wells
110 Possible movements
112 Microscope objective
114 Image sensor
116 Overview camera
118 Evaluation unit
120 Machine-Learning-based system
122 Distance determination unit
124 Sample plane
126 Control/drive unit
128 Movement arrow
130 Distance between placement surface of the sample carrier and the sample plane
200 Block diagram of an alternative setup
202 Mirror
204 Objective turret
206 Objective
300 Recorded digital images
302 Displacement arrow
304 Corresponding structures
306 Corresponding structures
308 Displacement vector
310 Reference point
400 Method
402 Method step
404 Method step
406 Method step
500 Computer system
502 Processor
504 Memory system
506 Bus system
508 RAM
510 ROM
512 Long-term memory
514 I/O controller
516 Program modules and data
518 Keyboard
520 Screen
522 Network adapter

The invention claimed is:

1. A distance determination system for a microscope system, the distance determination system comprising:
a sample stage having a placement surface configured to hold a sample carrier, wherein the sample stage is displaceable along at least one direction of extent of a sample plane;
an overview camera with a non-telecentric objective configured to produce digital images, wherein the overview camera is directed at the sample stage;
an evaluation unit connected to the overview camera, the evaluation unit including
a storage system configured to store at least two recorded digital images of the sample stage at different viewing angles; and
a trained machine-learning-based system configured to identify corresponding structures of the sample carrier placed into the sample stage in the two recorded digital images, wherein the trained machine-learning-based system comprises a trained reference model that is trainable by way of a set of annotated training images of sample carriers in a manner such, and the trained machine-learning-based system is thus adapted such, that corresponding structures in the at least two recorded digital images are associable with one another; and
a distance determination unit configured to determine a distance of a reference point of the sample carrier from a reference point of the overview camera based on the different viewing angles onto the sample stage and a pixel distance of the two recorded digital images with respect to one another using the associated corresponding structures contained in the at least two recorded digital images,
wherein the trained machine-learning-based system is configured to classify individual pixels of the at least two recorded images, and
wherein an optimization of a target function having a plurality of corresponding structures of the at least two recorded digital images is used as input data, wherein a result of the target function indicates the pixel distance.

2. The distance determination system of claim 1, wherein the trained machine-learning-based system is configured to output a reference coordinate of one of the corresponding structures.

3. The distance determination system of claim 2, wherein a class of the reference coordinate of one of the corresponding structures is also output.

4. The distance determination system of claim 1, wherein the sample stage is illuminated using an illumination means.

5. The distance determination system of claim 1, wherein the sample carrier is a multiwell plate, a slide, a Petri dish, or a chamber slide.

6. The distance determination system of claim 1, wherein the distance determination unit is further configured to determine a distance of the sample stage from a reference point of the overview camera.

7. The distance determination system of claim 1, further comprising:
a drive unit configured to change a distance of the sample stage relative to the overview camera.

8. The distance determination system of claim 1, wherein the overview camera or an optical element is positioned at an objective turret of the microscope system.

9. The distance determination system of claim 1, wherein the overview camera is a microscope objective and an image sensor.

10. The distance determination system of claim 1, wherein the trained machine-learning-based system is configured for supervised and/or unsupervised learning.

11. The distance determination system of claim 1, wherein the trained machine-learning-based system is a neural network.

12. The distance determination system of claim 1, wherein the trained machine-learning-based system is further configured to associate corresponding structures in the at least two recorded digital images to identify corresponding structures of the sample stage and/or of a holding frame that has been placed into the sample stage in the two recorded digital images.

13. The distance determination system of claim 1, wherein the different viewing angles are caused by a relative movement between the sample stage and the overview camera.

14. The distance determination system of claim 1, wherein the different viewing angles are produced by recordings from two overview cameras located with an offset with respect to one another.

15. A computer-implemented method for a microscope system, wherein the microscope system includes a sample stage with a placement surface for holding a sample carrier, wherein the sample stage is displaceable along at least one direction of extent of a sample plane, and wherein the microscope system comprises an overview camera with a non-telecentric objective for producing digital images, wherein the overview camera is directed at the sample stage, the method comprising:
  storing at least two recorded digital images of the sample stage at different viewing angles;
  associating corresponding structures in the at least two recorded digital images using a trained machine-learning-based system to identify corresponding structures of the sample carrier placed into the sample stage in the two recorded digital images, wherein the trained machine-learning-based system comprises a trained reference model that is trainable by way of a set of annotated training images of sample carriers in a manner such, and the trained machine-learning-based system is thus adapted such, that corresponding structures in the at least two recorded digital images are associable with one another; and
  determining a distance of a reference point of the sample carrier from a reference point of the overview camera based on the different viewing angles onto the sample stage and a pixel distance of the at least two recorded digital images with respect to one another using the associated corresponding structures contained in the at least two recorded digital images,
  wherein the trained machine-learning-based system is configured to classify individual pixels of the at least two recorded images, and
  wherein an optimization of a target function having a plurality of corresponding structures of the at least two recorded digital images is used as input data, wherein a result of the target function indicates the pixel distance.

16. A non-transitory computer-readable medium for a microscope system, wherein the microscope system includes a sample stage with a placement surface for holding a sample carrier, wherein the sample stage is displaceable along at least one direction of extent of a sample plane, and wherein the microscope system includes an overview camera with a non-telecentric objective for producing digital images, wherein the overview camera is directed at the sample stage, wherein the non-transitory computer-readable medium has program instructions stored thereon, wherein the program instructions, when executed by one or more computers and/or control units and cause the one or the plurality of computers and/or control units to:
  store at least two recorded digital images of the sample stage at different viewing angles;
  associate corresponding structures in the at least two recorded digital images by using a trained machine-learning-based system for identifying corresponding structures of the sample carrier that has been placed into the sample stage in the at least two recorded digital images, wherein the trained machine-learning-based system has a trained reference model that is trainable by way of a set of annotated training images of sample carriers in a manner such, and the trained machine-learning-based system is thus adapted such, that corresponding structures in the at least two recorded digital images are able to be associated with one another; and
  determine a distance of a reference point of the sample carrier from a reference point of the overview camera based on the different viewing angles onto the sample stage and a pixel distance of the at least two recorded digital images with respect to one another using the associated corresponding structures contained in the at least two recorded digital images,
  wherein the trained machine-learning-based system is configured to classify individual pixels of the at least two recorded images, and
  wherein an optimization of a target function having a plurality of corresponding structures of the at least two recorded digital images is used as input data, wherein a result of the target function indicates the pixel distance.

17. A distance determination system for a microscope system, the distance determination system comprising:
  a sample stage having a placement surface configured to hold a sample carrier, wherein the sample stage is displaceable along at least one direction of extent of a sample plane;
  an overview camera with a non-telecentric objective configured to produce digital images, wherein the overview camera is directed at the sample stage;
  an evaluation unit connected to the overview camera, the evaluation unit including
    a storage system configured to store at least two recorded digital images of the sample stage at different viewing angles; and
    a trained machine-learning-based system configured to identify corresponding structures of the sample carrier placed into the sample stage in the two recorded digital images, wherein the trained machine-learning-based system comprises a trained reference model that is trainable by way of a set of annotated training images of sample carriers in a manner such, and the trained machine-learning-based system is thus adapted such, that corresponding structures in the at least two recorded digital images are associable with one another; and
  a distance determination unit configured to determine a distance of a reference point of the sample carrier from a reference point of the overview camera based on the different viewing angles onto the sample stage and a pixel distance of the two recorded digital images with respect to one another using the associated corresponding structures contained in the at least two recorded digital images,
wherein the trained machine-learning-based system is configured to output a reference coordinate of one of the corresponding structures, and
wherein an optimization of a target function having a plurality of corresponding structures of the at least two recorded digital images is used as input data, wherein a result of the target function indicates the pixel distance.

\* \* \* \* \*